US005363421A

United States Patent [19]

Obermeyer

[11] Patent Number: 5,363,421

[45] Date of Patent: Nov. 8, 1994

[54] CONTROL ROD GUIDE TUBE

[75] Inventor: Franklin D. Obermeyer, Pensacola, Fla.

[73] Assignee: Westinghouse Electric Corporation, Pittsburgh, Pa.

[21] Appl. No.: 91,696

[22] Filed: Jul. 13, 1993

[51] Int. Cl.[5] .................. G21C 1/04

[52] U.S. Cl. .................. 376/353; 376/377

[58] Field of Search .................. 376/353, 377, 463, 352, 376/285; 976/DIG. 132, DIG. 124

[56] References Cited

U.S. PATENT DOCUMENTS

| | | | |
|---|---|---|---|
| 3,940,311 | 2/1976 | Frisch | 376/353 |
| 4,265,708 | 5/1981 | Lawrence | 376/352 |
| 4,313,796 | 2/1982 | Buettiker | 376/353 |
| 4,333,798 | 6/1982 | Anthony | 376/449 |
| 4,584,168 | 4/1986 | Formanek | 376/353 |
| 4,597,935 | 7/1986 | Verdeau et al. | 376/353 |
| 5,053,189 | 10/1991 | Chrise et al. | 376/353 |
| 5,237,595 | 8/1993 | Woodcock | 376/353 |
| 5,263,060 | 11/1993 | Obermeyer | 376/254 |

FOREIGN PATENT DOCUMENTS 0467093 1/1992 European Pat. Off. .

*Primary Examiner*—Donald P. Walsh
*Assistant Examiner*—Meena Chelliah
*Attorney, Agent, or Firm*—Walter S. Stevens

[57] ABSTRACT

Control rod guide tube adapted to reduce vibration of a plurality of control rods disposed therein. The guide tube comprises an elongate housing surrounding the control rods, the housing having an opening at an end thereof for receiving a flowing fluid therethrough. The fluid has a velocity component acting transversely to the control rods sufficient to induce vibration of the control rods. However, the housing of the present invention has an intermediate portion pierced by a plurality of apertures for exit of the fluid from the housing to reduce the velocity of the fluid acting transversely to the control rods in order to reduce vibration of the control rods. As control rod vibration is reduced, control rod wear is mitigated.

4 Claims, 5 Drawing Sheets

160 80 90 95 250 140 180 150 270 275 290 260 210 200 120 230 130 60

CONTROL ROD GUIDE TUBE

BACKGROUND

This invention generally relates to control rod guide tubes and more particularly relates to a control rod guide tube adapted to reduce vibration of a plurality of control rods disposed therein, which control rod guide tube is suitable for use in pressurized water nuclear reactor pressure vessels.

Although devices for reducing vibration of control rods are known in the prior art, it has been observed that these prior art devices have certain limitations associated with them. However, before these limitations can be appreciated, some background is necessary as to the structure and operation of a typical pressurized water nuclear reactor pressure vessel and its associated control rod guide tubes.

In this regard, a nuclear reactor is a device for producing heat by controlled fission of neutron-producing fissionable material contained in fuel assemblies. A plurality of the fuel assemblies are grouped in a sealed reactor pressure vessel to define a nuclear reactor core therein. Pressurized liquid moderator coolant is caused to circulate through the pressure vessel and thus through the fuel assemblies for assisting in the fission process and for removing the heat produced by fission of the fissionable material contained in the fuel assemblies.

However, the neutrons produced by the fission process in the reactor core must be suitably controlled for safety reasons. Therefore, disposed in the pressure vessel are a plurality of control rod guide tubes, each control rod guide tube being aligned with its associated fuel assembly. Each control rod guide tube houses a plurality of movable control rods belonging to a control rod cluster assembly. Each control rod cluster assembly is slidably movable so that the control rods belonging to the control rod cluster assembly are capable of being slidably inserted into and withdrawn from each fuel assembly to control the fission process therein. Moreover, disposed in each guide tube are a plurality of guide plates having bores therethrough for slidably receiving respective ones of the control rods so that the control rods are suitably guided and laterally supported by the guide plates.

As the previously mentioned liquid moderator coolant circulates through each fuel assembly, it continues its upwardly flow path and enters the guide tube associated with that fuel assembly. As the liquid moderator coolant exits the guide tubes, it flows to a heat exchanger or steam generator for providing steam by means well known in the art.

In addition, the control rods themselves generate heat due to the nuclear transformations occurring therein as they absorb the fission neutrons that are produced by the fission process. Therefore, the control rods are cooled by the liquid moderator coolant to remove the heat generated by the control rods. In this regard, as the coolant enters the guide tube it suitably cools the control rods.

As the coolant enters the guide tube to flow upwardly therein, a portion of the coolant is allowed to escape the guide tube through a hole formed through the wall of the guide tube. In this regard, a prior art guide tube provides at least one generally rectangular hole of predetermined flow area that pierces the lower portion of the guide tube. A portion of the fluid admitted into the guide tube exits the guide tube through the hole. The remaining portion of the coolant flowing within the guide tube follows a flow path extending upwardly through the guide tube.

As the coolant is admitted into the prior art guide tube to flow upwardly therein, a portion of the coolant develops a cross flow component acting transversely to the control rods. This is so because, as the coolant flows upwardly within the guide tube, a portion of it will reverse or change direction (e.g., a change in direction of approximately 180°) in order to flow out the hole piercing the lower portion of the guide tube. This portion of the coolant will flow out the hole because of a pressure gradient exiting between the interior and the exterior of the guide tube. However, applicant has observed that, as the previously mentioned portion of the coolant changes direction to flow out the hole, it will impinge the control rods at a velocity acting transversely thereto sufficient to cause the control rods to vibrate. This vibration is undesirable because such vibration may ultimately cause the control rods to wear against one or more of the guide plates through which they are slidably received. This wear may potentially compromise the ability of the control rods to suitably slide in the bores of the guide plates and thus may potentially compromise the ability of the control rods to suitably control the fission process. Therefore, a problem in the art is to reduce vibration of the control rods to prevent control rod wear.

Devices for reducing vibration of control rods are known. A single guide tube and tube sheet tube carrying a control rod having an inner tube mounted within the tube sheet tube is disclosed in U.S. Pat. No. 4,584,168 titled "System For Controlling Destructive Vibration Of A Nuclear Control Rod" issued Apr. 22, 1986 in the name of Frank J. Formanck. The inner tube disclosed by this patent is fitted closely about the control rod. Mounted connections between the upper and lower ends of the inner tube are provided to route coolant for purposes of controlling vibration of the control rod. Although this patent discloses a guide tube capable of controlling vibration of a control rod carried within it, this patent requires mounted connections to route the coolant. It appears that the mounted connections of the Formanck device may give rise to at least the possibility of loose parts migrating in the reactor vessel, which loose parts may damage the internal components in the reactor vessel, should the mounted connections become disassociated from the inner tube. This would be undesirable for safety reasons.

Therefore, what is needed is a control rod guide tube adapted to reduce vibration of a plurality of control rods disposed therein, which control rod guide tube is suitable for use in pressurized water nuclear reactors.

SUMMARY

Disclosed herein is a control rod guide tube adapted to reduce vibration of a plurality of control rods disposed therein. The guide tube of the present invention comprises an elongate housing surrounding the control rods, the housing having an opening at an end thereof for receiving a flowing fluid therethrough. The fluid has a velocity component acting transversely to the control rods sufficient to induce vibration of the control rods. However, the housing has an intermediate portion pierced by a plurality of apertures for exit of the fluid from the housing in a manner that reduces the velocity of the fluid acting transversely to the control rods in order to reduce vibration of the control rods. In this manner, control rod wear is mitigated.

In its broad form, the invention is a control rod guide tube adapted to reduce vibration of a control rod disposed therein, comprising a housing surrounding the control rod, the housing adapted to receive a fluid capable of inducing vibration in the control rod, the housing having a predetermined intermediate portion thereof pierced by an aperture for exit of the fluid from the housing to reduce the vibration of the control rod.

An object of the present invention is to provide a control rod guide tube adapted to reduce vibration of a plurality of control rods disposed therein.

A feature of the present invention is the provision of a housing surrounding the control rods, the housing having an intermediate portion pierced by a plurality of apertures for exit of a liquid from the housing to reduce vibration of the control rods disposed therein in order to reduce wear of the control rods.

An advantage of the present invention is that the ability of the control rods to control the fission process in the reactor is not compromised because control rod wear is reduced.

These and other objects, features and advantages of the present invention will become apparent to those skilled in the art upon a reading of the following detailed description when taken in conjunction with the drawings wherein there is shown and described illustrative embodiments of the invention.

BRIEF DESCRIPTION OF THE DRAWINGS

While the specification concludes with claims particularly pointing out and distinctly claiming the subject matter of the invention, it is believed the invention will be better understood from the following description, taken in conjunction with the accompanying drawings wherein:

DESCRIPTION OF THE PREFERRED EMBODIMENTS

Disclosed herein is a control rod guide tube adapted to reduce vibration of a plurality of control rods disposed therein, which control rod guide tube is suitable for use in pressurized water nuclear reactor pressure vessels.

However, before describing the subject matter of the present invention, it is instructive first to briefly describe the structure and operation of a typical nuclear reactor pressure vessel and its associated guide tubes.

Figure 1:
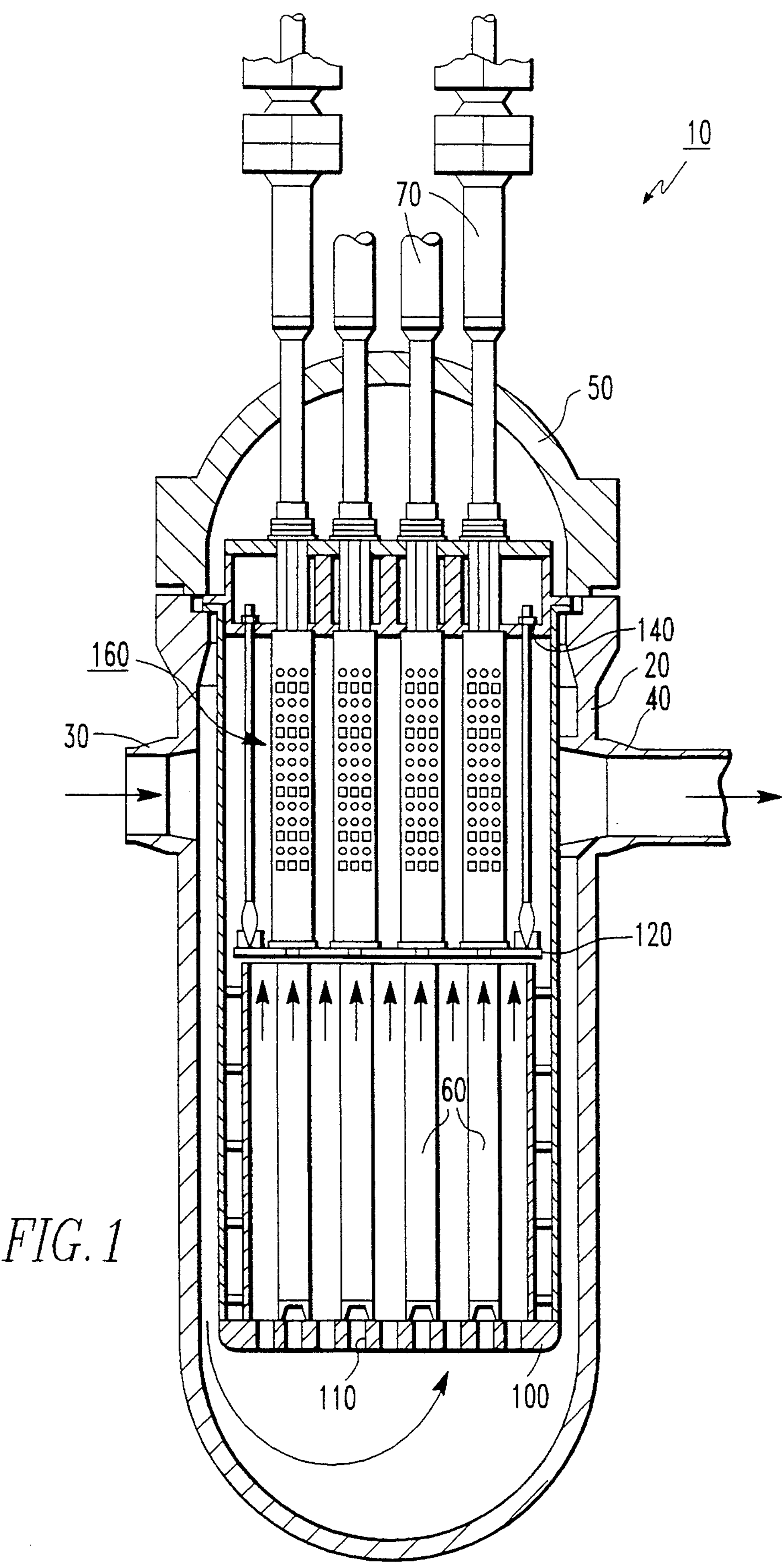
FIG. 1 shows in partial vertical section, a typical pressurized water nuclear reactor pressure vessel with parts removed for clarity, the pressure vessel having a plurality of control rod guide tubes disposed therein.

Therefore, referring to FIG. 1, there is shown a typical nuclear reactor pressure vessel, generally referred to as 10. Pressure vessel 10 includes a pressure vessel shell 20 open at its top end and having a plurality of inlet nozzles 30 and outlet nozzles 40 attached thereto (only one of each nozzle is shown). A vessel closure head 50 is mounted atop vessel shell 20 and is sealingly attached to the open top end of vessel shell 20 so that closure head 50 sealingly caps vessel shell 20. Capping vessel shell 20 in this manner allows for suitable pressurization of the liquid coolant circulating through pressure vessel 10. The flow path of the coolant is generally illustrated by the arrows appearing in the several figures.

Figure 3:
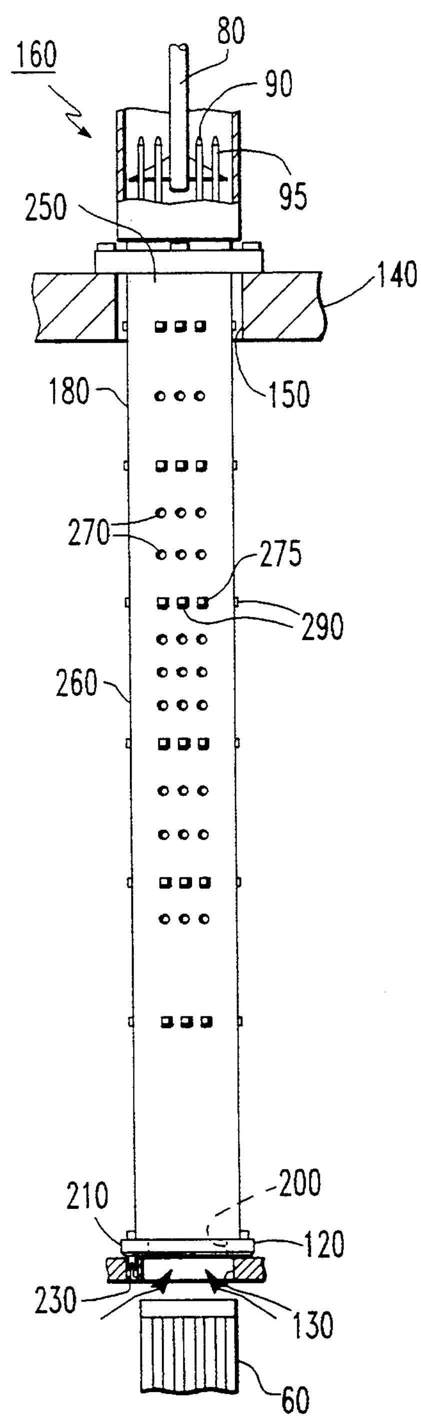
FIG. 3 shows in elevation a guide tube of the present invention for reducing vibration of control rods disposed therein.
Figure 4:
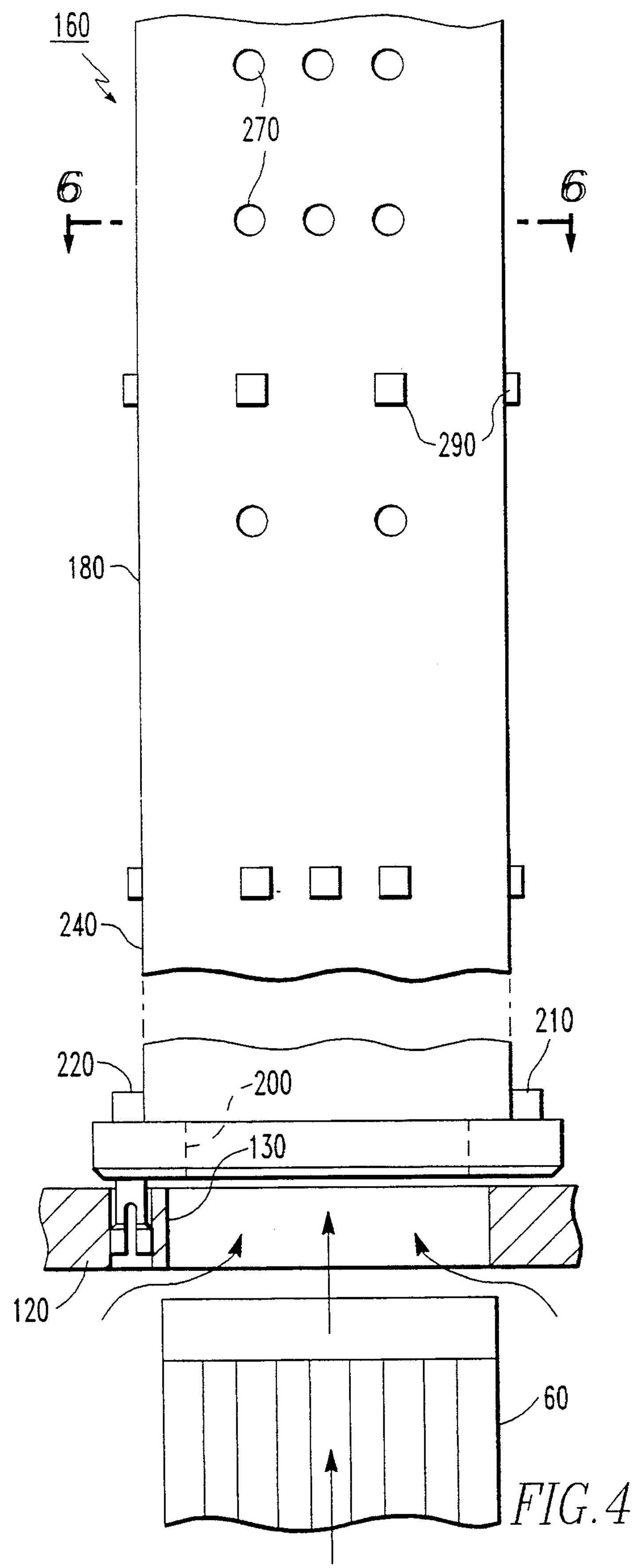
FIG. 4 shows in elevation an intermediate portion and a lower portion of the guide tube belonging to the present invention.

Still referring to FIG. 1, disposed in pressure vessel 10 are a plurality of nuclear fuel assemblies 60 containing fissionable material (not shown) capable of emitting fission neutrons in the course of generating heat. Formed through the top of closure head 50 are a plurality of control rod drive mechanisms (CRDM's) 70, each CRDM 70 containing a control rod assembly comprising an elongate and slidable control rod drive shaft 80 (see FIG. 3). Each control rod assembly also includes a control rod cluster 90 connected to control drive shaft 80, control rod cluster 90 comprising a plurality of elongate control rods 95 (see FIG. 3). Each control rod 95 includes absorber material for absorbing the previously mentioned neutrons in order to suitably control the fission process occurring in fuel assemblies 60.

Referring again to FIG. 1, disposed in pressure vessel 10 is a horizontally-oriented lower core plate 100 for supporting fuel assemblies 60 thereon. Lower core plate 100 has a plurality of bores 110 therethrough for passage of the coolant, which coolant then flows through fuel assemblies 60 after passing through bores 110 for removing heat from fuel assemblies 60 and for moderating the previously mentioned neutrons. Spaced above fuel assemblies 60 is an upper core plate 120 for reasons provided hereinbelow. Upper core plate 120 has a plurality of bores 130 therethrough for passage of the coolant. Moreover, spaced above upper core plate 120 is an upper support plate 140 having a plurality of bores 150 therethrough for reasons described presently. Interposed between upper core plate 120 and upper support plate 140 are a plurality of guide tubes, generally referred to as 160, for providing guidance support to control rods 95 (see FIG. 3) and coaxially aligned with fuel assemblies 60 so that control rods 95 may slidably penetrate fuel assemblies 60 to control the fission process therein.

Figure 2:
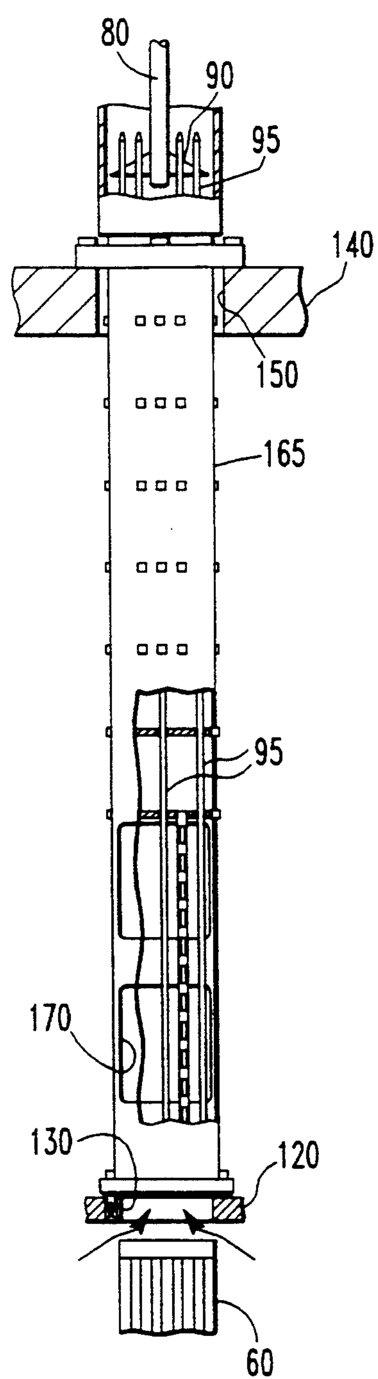
FIG. 2 illustrates in partial elevation a prior art guide tube having a plurality of holes in the lower portion thereof.
Figure 2A:
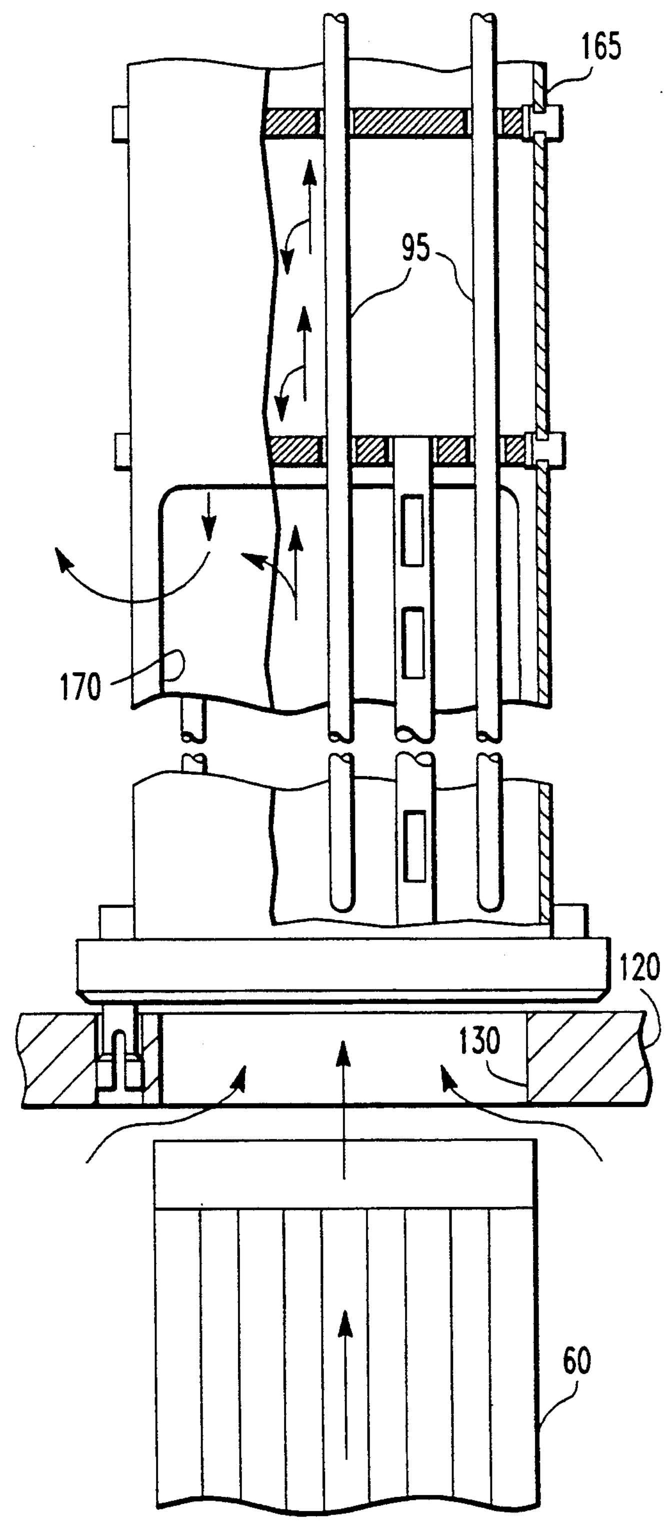
FIG. 2A illustrates in partial elevation, the lower portion of the prior art guide tube.

With particular reference to FIGS. 2 and 2A, there is illustrated a prior art control rod guide tube 165 enclosing control rods 95. As the coolant enters guide tube 165 at a velocity of approximately 15 to 20 feet per second to flow upwardly therein, a pressure gradient forms between the coolant flowing internally within guide tube 165 and the coolant flowing externally to guide tube 165. A portion of this coolant exits guide tube 165 through at least one generally rectangular hole 170 that pierces the lower portion of prior art guide tube 165. The cross-sectional flow area of hole 170 totals about 65 $in^2$. The remaining portion of the coolant flowing within prior art guide tube follows a flow path extending through guide tube 165. As the coolant flows upwardly within prior art guide tube 165, a portion of this upwardly flowing coolant develops a cross flow component acting transversely to control rods 95. This portion of the coolant will flow out hole 170 because of the pressure gradient existing between the interior and the exterior of guide tube 165. However, applicant has observed that, as the previously mentioned portion of the coolant flows out hole 170, it will impinge control rods 95 with a velocity acting transversely thereto sufficient to cause control rods 95 to undesirably vibrate. For safety reasons, it is desirable to provide a guide tube which is adapted to reduce or mitigate such undesirable vibration.

Therefore, referring to FIGS. 1, 3, 4, 5 and 6, each guide tube 160 of the present invention comprises a vertically-oriented, elongate and generally tubular housing 180 having a transverse cross section defining a perimeter 190 surrounding control rods 95. Housing 180 has an opening 200 at a flanged end 210 thereof for receiving the coolant therethrough. Extending through flanged end 210 are a plurality of leaf spring bolts 220, the bolts 220 matingly engaging associated bolt holes 230 formed transversely through upper core plate 120. Bolts 220 attach housing 180 to upper core plate 120. Moreover, opening 200 is coaxially aligned with bore 130 so that the coolant flowing through bore 130 enters through opening 200 and into housing 180. Housing 180 has a lower or first end portion 240 that includes the previously mentioned flanged end 210 and is preferably devoid of any side openings, apertures, or holes of any kind. The absence of holes in first end portion 240 prevents the coolant that flows upwardly within housing 180 from reversing direction to exit such holes. Preventing such reversal of direction of the coolant reduces coolant cross flow and the attendant control rod vibration, as described more fully hereinbelow. Housing 180 also has an upper or second end portion 250 received in bore 150 for laterally supporting housing 180. Housing 180 also has an intermediate portion 260 interposed between first end portion 240 and second end portion 250 and integrally attached thereto. Intermediate portion 260 is pierced by a plurality of apertures 270 of predetermined area for exit of the coolant from housing 180 to reduce vibration of control rods 95. The area (e.g., about 1.71 $in^2$) of each aperture 270 is predetermined to allow the coolant to exit housing 180 to reduce vibration of control rods 95 therein. Apertures 270 are preferably circular or oblong in shape. There may be eight horizontally aligned apertures 270 spaced around housing 180 to define a group of apertures. A plurality of these groups (e.g., 12 groups) may each be spaced-apart along the length of intermediate portion 260 of housing 180. Also formed around housing 180 are a plurality of slots 275 for reasons disclosed hereinbelow.

Figure 5:
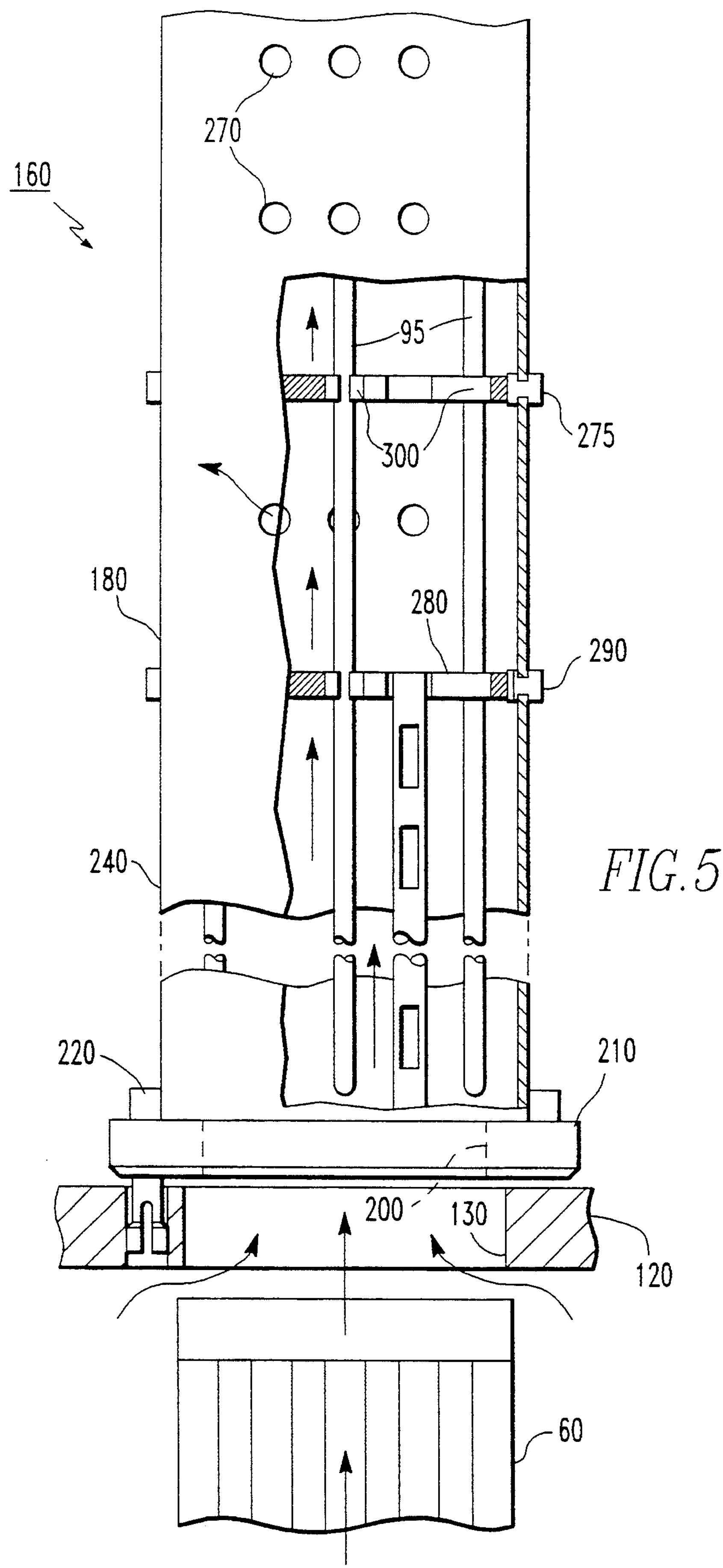
FIG. 5 shows in partial elevation the intermediate portion and the lower portion of the guide tube belonging to the present invention.
Figure 6:
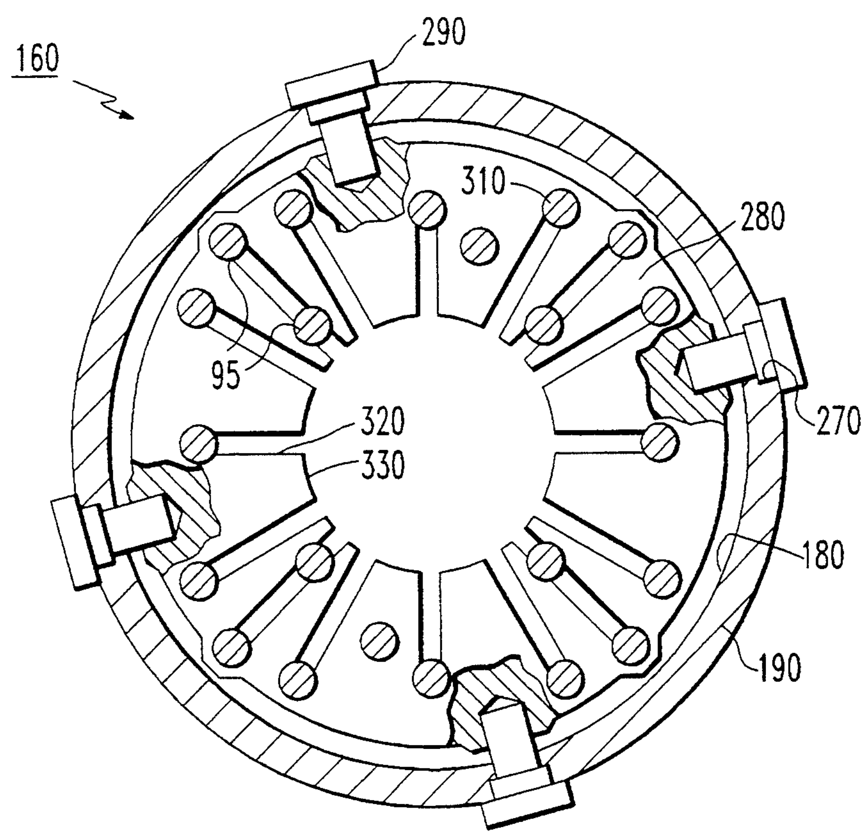
FIG. 6 is a view taken along section line 6—6 of FIG. 4.

As best seen in FIGS. 5 and 6, disposed in housing 180 are a plurality of spaced-apart coaxially aligned and horizontally-oriented guides or guide support plates 280, which guide plates 280 may be generally circular. Each support plate 280 has a marginal edge therearound that generally conforms to the inside surface of housing 180. Moreover, engaging the marginal edge of each support plate 280 are a plurality of spaced-apart pins 290, each pin 290 being sized to matingly fit within respective ones of the slots 275 in order to connect each guide support plate 280 to housing 180. Each guide support plate 280 also includes a plurality of bores 310 therethrough for slidably receiving respective ones of the control rods 95 in order to provide guidance support to control rods 95. Moreover, formed transversely through each support plate 280 are a plurality of flow passages 320 and a centrally disposed opening 330 for allowing the coolant to pass upwardly through support plate 280 and housing 180.

OPERATION

During operation of pressure vessel 10, the liquid moderator coolant enters inlet nozzle 30 eventually to flow upwardly through bores 110 formed through lower core plate 100. As the coolant flows through bores 110, it flows through fuel assemblies 60 to remove the heat generated thereby and to moderate fission neutrons. As the coolant flows through fuel assemblies 60, it flows through bores 130 formed in upper core plate 120 to then enter opening 200 of housing 180 in order to surround control rods 95 disposed therein. As the coolant enters housing 180 to flow upwardly therein, a pressure gradient forms between the coolant flowing internally within guide tube 160 and the coolant flowing externally to guide tube 160. The prior art practice of forming a hole in the lower portion of housing 180 developed a relatively large cross flow velocity component acting transversely to control rods 95. This cross flow component of the coolant impinged control rods 95 with a velocity sufficient to cause control rods 95 to undesirably vibrate.

However, applicant's placement of apertures 270 in the intermediate portion of housing 180 will reduce the velocity of the cross flow component of the coolant impinging control rods 95 and thus will reduce the previously mentioned vibration of control rods 95. More specifically, a portion of the coolant will exit through apertures 270 as the coolant travels upwardly through housing 180. As the coolant exits apertures 270, the previously mentioned cross flow velocity component will be reduced in order to reduce the velocity of the coolant impinging control rods 95.

Although the invention is fully illustrated and described herein, it is not intended that the invention as illustrated and described be limited to the details shown, because various modifications may be obtained with respect to the invention without departing from the spirit of the invention or the scope of equivalents thereof. For example, apertures 270 formed in housing 180 need not be oblong; rather, apertures 270 may be of any suitable shape and number sufficient to prevent the coolant from vibrating control rods 95.

Therefore, what is provided is a control rod guide tube adapted to reduce vibration of a plurality of control rods disposed therein, which control rod guide tube is suitable for use in pressurized water nuclear reactors.

What is claimed is:

1. A control rod guide tube adapted to reduce vibration of a control rod disposed therein, comprising a housing surrounding the control rod, said housing adapted to receive a fluid flowing in a predetermined direction and capable of inducing vibration of the control rod, said housing having a predetermined intermediate portion thereof pierced by an aperture for exit of the fluid from said housing while preventing the fluid from reversing direction, so as to reduce the vibration of the control rod.

2. The guide tube of claim 1, further comprising a guide disposed in said housing, said guide defining a bore therethrough for receiving the control rod to provide guidance to the control rod.

3. A control rod guide tube adapted to reduce flow-induced vibration of a plurality of elongate control rods slidably disposed therein, comprising:

(a) an elongate housing surrounding the control rods, said housing having an opening at an end thereof for receiving a flowing fluid upwardly therethrough and capable of impinging the control rods at a velocity sufficient to induce vibration of the control rods, said housing having an intermediate portion pierced by a plurality of apertures for exit of the fluid from said housing while preventing the fluid from reversing direction, so as to reduce vibration of the control rods; and (b) a plurality of spaced-apart support guides disposed in said housing and connected thereto, each of said support guides defining a plurality of bores therethrough for slidably receiving respective ones of the control rods to provide guidance support to the control rods, whereby the velocity of the fluid impinging the control rods is reduced as the fluid exits the apertures, and whereby the vibration of the control rods is reduced as the velocity of the fluid impinging the control rods is reduced.

4. In a nuclear reactor pressure vessel having a liquid flowing upwardly therethrough, a control rod guide tube for providing guidance support to a plurality of vertically-oriented elongate control rods slidably disposed therein, the control rod guide tube adapted to reduce flow-induced vibration of the control rods, the control rod guide tube comprising:

(a) a vertically-oriented elongate housing having a tubular transverse cross section defining a perimeter surrounding the control rods, said housing having an opening at an end thereof for receiving the liquid therethrough, the liquid having a velocity component acting transversely to the control rods sufficient to induce vibration thereof, said housing having an intermediate portion pierced by a plurality of circularly-shaped apertures for exit of the liquid from said housing while preventing the liquid from reversing direction, so as to reduce vibration of the control rods; and (b) a plurality of spaced-apart coaxially aligned and horizontally-oriented guide support plates disposed in said housing and connected thereto, each of said plates defining a plurality of transverse bores therethrough for slidably receiving respective ones of the control rods to provide guidance support to the control rods, whereby the velocity component of the liquid impinging the control rods is reduced as the liquid flows through the opening, enters said housing, and exits the apertures, and whereby the vibration of the control rods is reduced as the velocity component of the liquid impinging the control rods is reduced.

* * * * *